(12) United States Patent
Debailleul

(10) Patent No.: US 6,502,424 B1
(45) Date of Patent: Jan. 7, 2003

(54) PROCESS AND PLANT FOR PROCESSING INTERLEAVED GLASS

(76) Inventor: Gérard Jean-Marie Debailleul, Kothemstraat 113, Schepdaal (BE), 1703

(*) Notice: Subject to any disclaimer, the term of this patent is extended or adjusted under 35 U.S.C. 154(b) by 0 days.

(21) Appl. No.: 09/462,363

(22) PCT Filed: Jul. 7, 1998

(86) PCT No.: PCT/BE98/00103
§ 371 (c)(1),
(2), (4) Date: Mar. 15, 2000

(87) PCT Pub. No.: WO99/02460
PCT Pub. Date: Jan. 21, 1999

(30) Foreign Application Priority Data

Jul. 7, 1997 (BE) .............................. 9700581

(51) Int. Cl.$^7$ .................. C03C 15/00; C03B 33/02; C03B 23/00
(52) U.S. Cl. .................. 65/30.1; 65/111; 65/112; 65/268
(58) Field of Search ................ 65/134.8, 30.1, 65/111, 112, 268

(56) References Cited

FOREIGN PATENT DOCUMENTS

| DE | 195 09 244 C1 | 7/1996 |
|---|---|---|
| EP | 0 567 876 A1 | 11/1993 |
| EP | 0 792 730 A2 | 9/1997 |
| EP | 0 850 743 A1 | 7/1998 |

*Primary Examiner*—Christopher A. Fiorilla
(74) *Attorney, Agent, or Firm*—Piper Rudnick LLP; Jerold I. Schneider

(57) ABSTRACT

A method and plant for treating laminated glass having at least two glass sheets between which is arranged at least on intermediate sheet of non-glass material. The glass is attacked in a basic solution of fragmented laminated glass, so as to obtain an attack medium, wherein the fragments are disintegrated into non-laminated glass fragments and non-glass material, separating in a) the basic solution, b) the disintegrated non-laminated fragments and c) the disintegrated fragments of the non-glass material, and neutralizing the disintegrated fragments "b) and c)" before their subsequent recycling or upgrading.

17 Claims, 1 Drawing Sheet

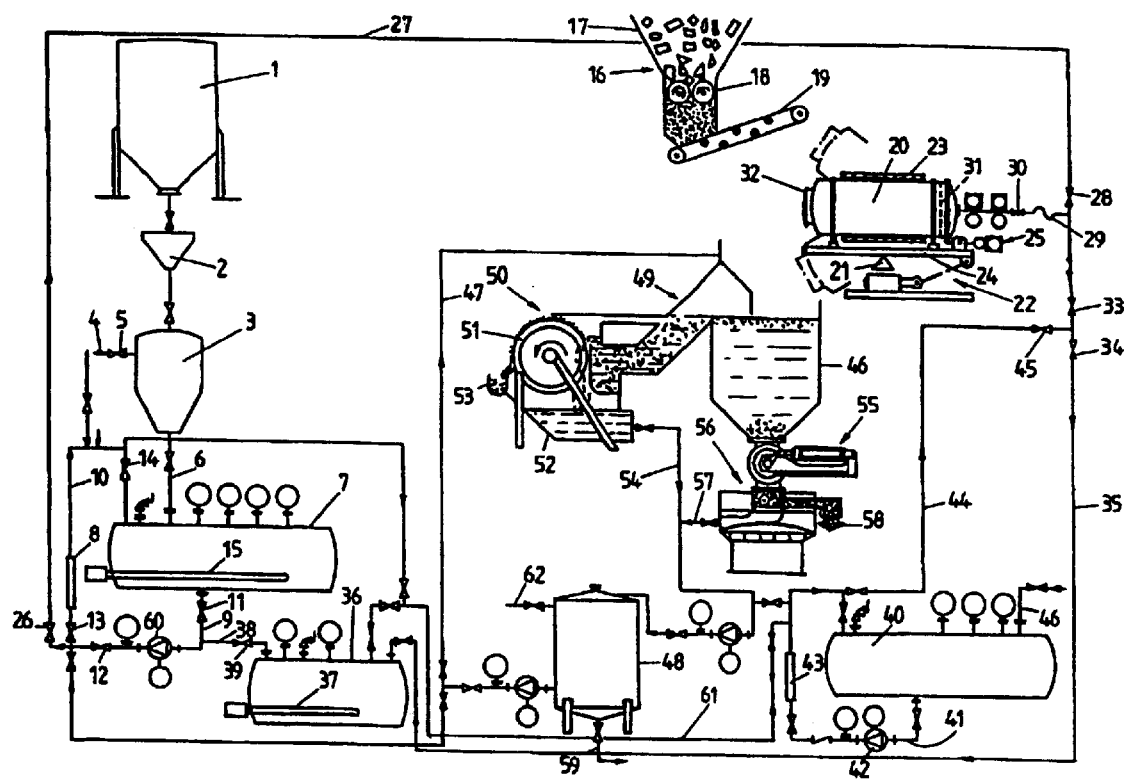

PROCESS AND PLANT FOR PROCESSING INTERLEAVED GLASS

CROSS-REFERENCE TO RELATED APPLICATIONS

This application claims priority from Belgium Application No. 9700581, filed Jul. 7, 1997 and PCT Application No. PCT/BE98/00103, filed Jul. 7, 1998, both of which are hereby incorporated by reference.

BACKGROUND OF THE INVENTION

This invention concerns a process for the processing of inter-leaved glass and a plant to implement the process.

Interleaved glass is to be understood as a product consisting of two or more sheets of drawn glass, plate glass or cast glass, joined over all their surface by one or a number of intermediate layers not made of glass. These may for example act as wiring that holds together the fragments of glass in case of breakage and ensures residual strength to the whole. Interleaved glass is used in particular in manufacturing the windscreens of vehicles such as motor-cars, aeroplanes, passenger ships, etc., or for safety glass, in particular for bank counters.

Up to now interleaved glass scrap material has been of little or no reuse value. At present, in fact, scrap windscreens are crushed by passing them between two pressure rollers. It might thus be possible to recover certain glass fragments that have separated from the inter-medisate layers and to recycle them, but in general everything is simply dispatched to a dump. The risk, for example, of presence of plastic residues containing fragments of glass makes it inappropriate in current glass recycling operations to recover inter-leaved glass and recycle it.

SUMMARY OF THE INVENTION

The purpose of the present invention is to provide a solution to the problem by simultaneously allowing recovery and perhaps recycling of the material of which the intermediate layers of interleaved glass are made. Advantageously the process and plant set up for this purpose should not lead to another significant environmental problem.

Under the invention the problem posed is resolved by a process of treatment of interleaved glass comprising at least two sheets of glass between which at least one intermediate layer made of a non-glass material is inserted, the said process comprising fragmentation of the interleaved glass to be processed, attack of the fragmented interleaved glass with a basic solution, separation of basic solution, glass and c) non-glass material, this process being characterized by the fact that the attack includes an attack on all the interleaved glass in fragments originating from the fragmentation, in such a way as to obtain an attack medium in which a disassociation takes place, in all the said fragments originating from fragmentation, of non-interleaved fragments of glass and fragments of said non-glass material, that the separation comprises separation between a) the basic solution, b) the fragments of non-interleaved glass that have undergone attack by the basic solution and c) the fragments of non-glass material that have undergone attack by the basic solution, and that the process also includes neutralization of the disassociated fragments b) and c), before any recycling or reuse thereof.

Thus with the process under the invention the glass and the material constituting the intermediate layers are disassociated. The glass and the non-glass material are perfectly clean on leaving the process. They emerge in the form of small fragments immediately reusable in glass processes on one hand, and non-glass materials on the other. This chemical process has the particular feature that it does not involve any chemical reaction between the basic solution and the fragments and that the basic solution remains virtually unaltered after the process, so that it can be reused a number of times for subsequent operations.

The basic attack solution may be water-solution of an OH ion generating agent soluble in water, specifically an alkaline base or earth-alkaline base. preferably NaOH or KOH. Advantageously the basic attack solution is a water-solution of 5 to 15 molar, preferably about 10 molar, NaOH.

Glass may according to the invention be any type of non-composite glass, whether drawn, cast, tinted, transparent, translucent, opaque cut, or treated in another way.

Non-glass material may according to the invention be any material of which the intermediate sheets used in manufacture of interleaved glass are made. Polyvinylbutyral may be mentioned as an example.

According to one mode of implementation of the process according to the invention, the said separation includes sedimentation of a mix of disassociated fragments b) and c), previously separated from the basic solution, in a sedimentation liquid in which the disassociated fragments of the non-interleaved glass having undergone attack by the basic solution b) are deposited, and the disassociated fragments of non-glass material having undergone attack by the basic solution c) float, and a separate collection of the disassociated fragments b) and disassociated fragments c). This mode of implementation advantageously profits from the difference in density between the glass and the non-glass material of the intermediate layers having undergone attack by the basic solution so that they can easily be separated by a simple sedimentation process. The liquid used may advantageously be simply water. Preferably the said liquid does not react in any way either with the fragments of the glass or with the fragments of the non-glass material, and its long use and/or recycling may easily be envisaged.

According to another mode of implementation under the invention, the process comprises the said neutralisation of a mix of the disassociated fragments b) and c), previously separated from the basic solution, by means of an acid not aggressive for glass or the non-glass transparent material. The non-aggressive acid may be a weak acid, in particular phosphoric acid. This acid may also be used on occasion, when the basic attack solution becomes overloaded, to neutralise the basic solution used and thus form a water-solution of sodium phosphate which may itself be reusable, for example in the area of fertiliser manufacture.

This invention also concerns a plant for implementation of the interleaved treatment process. The said plant comprises:

an interleaved glass fragmentation device, a reactor into which the interleaved glass fragments issuing from the fragmentation device are fed together with a basic solution so as to form an attack medium in which disassociation of all the fragments coming from the fragmentation device into fragments of non-interleaved glass and fragments of the said non-glass material takes place, a separating device allowing a) the basic solution. b) the disassociated fragments of non-interleaved glass having undergone attack by the basic solution and c) the disassociated fragments of the said non-glass material having undergone attack by the basic solution to be separated, and a source of neutralising agent enabling neutralisation of the disassociated fragments b) and c) prior to any recycling or reuse.

This relatively simple plant has an entirely justifiable cost as it allows each of the constituent elements of interleaved glass to be reused. A plant of this kind can even be envisaged on one or two semi-trailer platforms in order to provide a mobile plant transportable from dump to dump.

The fragmentation device may be any kind of mill, for example of blade, hammer or ball type, or any crushing device, possibly a mincroniser.

BRIEF DESCRIPTION OF THE DRAWINGS

Other details and particular features of the invention will emerge from the description given below, devoid of limiting effect, with reference to the single annexed figure.

The said single figure diagrammatically represents a plant according to the invention.

DETAILED DESCRIPTION OF THE INVENTION

The basic solution, of caustic soda for example, is prepared in any of the ways known to experts. In this connection reference may for example be made to International Patent WO-97/00099.

In the example illustrated, caustic soda flakes or pellets are put and stored in a bin 1. By means of a batcher 2 the caustic soda is transferred to a pressure vessel 3 into which water is injected through the connecting pipe 4, shut off by a valve 5. The water is only injected into the vessel 3 for the first preparation of basic attack solution. For subsequent preparations the water may be wholly or partly replaced by previously prepared basic solution. The basic solution is then transferred through pipe 6 to a preparation tank 7. This is filled gradually in order to avoid the thermal and exothermal shocks of the reaction between soda and water, which lead to a temperature in the region of 80° C. A static mixer 8, through a set of pipes 9 and 10 and valves 11, 12, 13 and 14, allows constant movement of the basic solution contained in the preparation tank 7. A heating element 15 allows a basic solution having a temperature of about 200° C. to be gradually achieved.

The glass scrap is put into a mill 16 through a hopper 17 which channels the interleaved glass between two crushing rollers 18. These grind the interleaved glass into small fragments which are removed by a conveyor belt 19.

The reactor 20 is mounted on a tipping platform 24 on a pivot 21.

The tipping motion is generated in a known way, for example by the action of a hydraulic or pneumatic jack and connecting rods, designated as a whole by reference 22.

The reactor is enveloped at least in part by a heating system 23 and is mounted on the platform 24 so that it can rotate around its lengthwise axis under the action of a driving motor 25.

The end of the reactor 20 is connected to the preparation tank 7 by the pipe 9, a pump 60, the valve 12, a valve 26, the feed pipe 27, a valve 28, a flexible tube 29 and a valve 30. Inside the reactor, in front of the orifice through which the flexible tube 29 emerges into the reactor 20, there is a filter 31 represented diagrammatically by a dashed line. The reactor head has a door 32 movable between open position and closed position. The reactor walls may be furnished with pyramidal points and/or a beating chain in order to improve the grinding effect.

Through the valve 30 and flexible tube 29, and also valves 33 and 34 and the recycling pipe 35, the end of the reactor 20, is also in communication with a buffer tank 36 fitted with a heating element 37. This is itself in communication with the preparation tank 7 through the pipe 38 and the valve 39. The buffer tank allows recycling of the basic attack solution, while adjustment of the refed basic solution's molarity in the feed circuit is carried out through the preparation tank 7.

A neutralisation tank 40 full of a dilute water-solution of phosphoric acid is linked to the end of the reactor by the pipe 41, pump 42, static mixer 43, feed pipe 44, valve 45, valve 33, flexible tube 29 and valve 30. Fresh phosphoric acid is fed into the neutralisation tank through the pipe 46. The buffer tank 36 and the neutralisation tank 40 can communicate with each other through a transfer pipe 61.

Above the reactor 20 there is a sedimentation tank 46. which is fed with sedimentation liquid, specifically water, through a water pipe 47 coming from a water tank 48. The fragments of plastic material from the intermediate layers float, while the glass is deposited on the bottom of the tank.

An overflow 49 is located at the side, in the upper part of the tank. The fragments of non-glass material are drawn through this overflow 49, together with part of the sedimentation water, into a water/non-glass separator 50. This consists of a perforated drum 51 provided with small hooks which carry along the fragments of for example plastic material. The water drains through the perforations into the water collection tank 52. The plastic material is held by raking elements in a drainage gutter 53. The water in the collection tank 52 can be recycled into the water tank 48 through the recycling pipe 54.

At the bottom of the sedimentation tank there is a valve 55, for example a slide valve, which can let the remaining water and the deposited glass pass from the sedimentation tanks 46 into a water—glass separator, for example a vibrating separator 56. The water is drained from the bottom through a vibrating screen and can be recycled to the water tank 48 through a pipe 57 which comes out into the recycling pipe 54.

The glass fragments are removed laterally by the vibrating screen to an outlet 58.

The water tank 48 is provided with a bottom outlet pipe 59 for the stale water and a top pipe 62 for inlet of fresh water.

Operation of this plant will now be described on the basis of an example of implementation given solely for purposes of illustration.

Interleaved glass consisting of scrap from car windscreens and from safety glass coming from the demolition of bank branches is first broken down in the mill 16.

A reactor 20 with a capacity for example of 2 m$^3$ is set with its head upwards (see representation with dashed lines). The door 32 can then be opened and the fragments of interleaved glass fed into the reactor 20 by the conveyor belt 19. When about ⅔ of the volume of the reactor has been tilled, the door 32 is closed, and the reactor is swung back to its horizontal position.

NaOH basic solution at about a 10-molar concentration is sent from the preparation tank 7 to the reactor 20 through the feed pipe 27. until the volume of the reactor is ¾ filled.

The reactor 20 is then set to turn around its axis at a speed for example of 25 revolutions per minute. The temperature inside the reactor is kept lower than the degradation temperature of the glass and the non-glass material of which the interleaved glass intermediate layers are made. The temperature is advantageously above 180° C., preferably about 200° C.

A vapour pressure of at least 8 bars, advantageously from 10 to 20 bars, preferably around 15 bars, is installed.

After 15 minutes of reaction, disassociation between the glass and the plastic material forming the intermediate layers has taken place. At this moment the valve 30 is opened and the basic attack solution is recycled through the pipe 35 to the buffer tank 13, passing through the filter 31 located at the end of the reactor. The non-interleaved fragments of glass and plastic material are thus held in the reactor. The basic solution leaving the reactor is only slightly impoverished and the NaOH topping-up requirement is less than 2%. The NaOH has not therefore reacted with the layered glass components, but has allowed their disassociation through a thermochemical reaction.

Dilute phosphoric acid from the neutralisation tank 40 is then sent into the reactor 20, which still contains disassociated fragments. The reactor is started up again for a few revolutions while the pressure is removed. The fragments of non-interleaved glass and plastic material are thus brought to a neutral pH in the range from 6 to 8. The reactor is then swung to the head downward position (see dashed line representation) and the door 32 is opened. The reactor contents consisting of neutralised fragments and a little sodium phosphate solution are poured into the sedimentation tank 9, the valve 55 of which is closed.

The sedimentation tank 9 is then fed with water from the water tank 48 through the pipe 47. The plastic fragments float on the water and are drawn through the overflow 49 into the separator 50, while the non-interleaved glass fragments settle on the bottom of the tank 46.

When the sedimentation water no longer contains floating fragments, the water feed is cut off and valve 55 opened. The water and the glass fragments are then separated in the separator 56.

The fragments of plastic material, in the form of shriveled pellets, and the fragments of non-interleaved glass are fully ready to be sent to reusing or recycling industries.

The basic solution in the buffer tank 36 is transferred to the preparation tank 7 where it is equalised from the molar concentration standpoint, and a new process can start. A complete circuit takes about 30 minutes. With a 2 m³ reactor a processing rate of 3 tons an hour can be expected.

After a number of treatments the overloaded basic solution must be neutralised. The solution in the tank 7 is cooled. It is transferred to the buffer tank 36 and then to the neutralisation tank 40. The neutralised liquid is transferred to the water tank 48. The water is immobilised for a time in order to allow decantation. Stale water mainly containing sodium phosphate is then removed through the bottom pipe 59.

To summarise, the process and plant according to the invention allow the same basic attack solution to be used for a large number of cycles. The materials to be reused are separated and above all are not altered by this attack. It restores them clean and ready for recycling, in small fragments. There is no fear of any expulsion either into the atmosphere or into effluents, except from time to time for evacuation of a sodium phosphate solution. The process thus takes place in an almost closed circuit. Water consumption is very low.

It is to be understood that this invention is in no way limited to the form of implementation set out above and that many changes may be made without going outside the framework of the attached claims.

What is claimed is:

1. A process for processing interleaved glass consisting of at least two sheets of glass between which at least one intermediate layer made of a non-glass material is placed, said process comprising:
    a fragmentation of the interleaved glass to be processed, with formation of fragments of interleaved glass,
    an attack by a basic solution of said fragments of interleaved glass, in such a way as to obtain an attack medium in which a disassociation takes place in all said fragments of interleaved glass into fragments of non-interleaved glass and fragments of the said non-glass material,
    a separation between a) the basic solution, b) the fragments of non-interleaved glass that have undergone attack by the basic solution and c) the fragments of non-glass material that have undergone attack by the basic solution, and
    a neutralisation of the disassociated fragments b) and c), before any recycling or reuse thereof.

2. The process according to claim 1, wherein said separation includes filtering of the attack medium after disassociation, and separate collection of a filtrate formed by the basic solution and a mix of the disassociated fragments b) and c).

3. The process according to claim 1, wherein said separation comprises sedimentation of a mix of the disassociated fragments b) and c), previously separated from the basic solution, in a sedimentation liquid in which the disassociated fragments of non-interleaved glass b) are deposited and the disassociated fragments of non-glass material c) float, and separate collection of the disassociated fragments b) and the disassociated fragments c).

4. The process according to claim 3, wherein said separate collection includes isolation of the sedimentation liquid drawn with the disassociated fragments b) from the disassociated fragments c) collected, and the process also includes possible recycling of the isolated sedimentation liquid to said sedimentation.

5. The process according to claim 1, comprising recycling of the basic solution resulting from the said separation to the said attack on the interleaved glass in fragments.

6. The process according to claim 1, comprising attacking on interleaved glass in fragments with a basic water-solution under a vapor pressure of at least 8 bars and at a temperature lying between 180° C. and a degradation temperature of the glass or the said non-glass material, with agitation of the attack medium during the said attack.

7. The process according to claim 6, wherein the basic water solution has a vapor pressure from 10 to 20 bars, and a temperature of about 200° C.

8. The process according to claim 1, wherein the basic attack solution is a water-solution of 5 to 15 molar NaOH.

9. The process according to claim 8, wherein the basic attack solution is a solution of about 10 molar NaOH.

10. The process according to claim 1, comprising the said neutralization of a mix of the disassociated fragments b) and c), previously separated from the basic solution, with a dilute solution of acid not aggressive for glass and/or the non-glass material.

11. A plant for implementation of the process for processing interleaved glass according to claim 1, including:
    a device for fragmentation of interleaved glass,
    a reactor into which all the interleaved glass in fragments issuing from the fragmentation device and a basic solution are introduced so as to form an attack medium in which disassociation takes place, in all the fragments issuing from the fragmentation device, of fragments of non-interleaved glass and fragments of the said non-glass material, a separation device allowing a) the basic solution, b) the disassociated fragments of non-interleaved glass having undergone attack by the basic solution and c) the disassociated fragments of the said non-glass material having undergone attack by the basic solution to be separated, and a source of neutralizing agent allowing neutralization of the disassociated fragments b) and c) before their possible recycling or reuse.

12. A plant according to claim 11, wherein the reactor presents a first blockable opening and said separation device includes a filter, which is located in the reactor in front of the said first opening and which, when the said first opening is in open position, is capable of separating the attack medium into, on the one hand, the basic solution in the form of a filtrate evacuated from the reactor and, on the other hand, the disassociated fragments of non-interleaved glass b) and the disassociated fragments of non-glass material c), which are retained inside the reactor.

13. A plant according to claim 11, wherein the separation device comprises a sedimentation tank containing a sedimentation liquid into which a mix of disassociated fragments of b) and c) coming from the reactor is introduced and in which the disassociated fragments of non-interleaved glass b) settle and the disassociated fragments of non-glass material c) float.

14. A plant according to claim 13, wherein the sedimentation tank has in its upper part a pipe for the removal of the floating disassociated fragments c) and sedimentation liquid, the said pipe communicating with a separator capable of extracting the disassociated fragments c) from the sedimentation liquid in which they are floating.

15. A plant according to claim 13, wherein the sedimentation tank comprises at the bottom a blockable orifice through which the disassociated fragments b) that are deposited and the sedimentation liquid can pass, when the orifice is in open position, and which is in communication with a separator capable of extracting the disassociated fragments b) from the sedimentation liquid.

16. A plant according to claim 13, wherein the source of neutralizing agent is a tank containing a water-solution of acid not aggressive for glass and/or the non-glass material and which can be put into communication with the reactor after separation of the basic solution a) from the attack medium.

17. A plant according to claim 11, wherein the reactor has a second blockable opening through which the interleaved glass fragments can be introduced into the reactor and a mix of disassociated fragments b) and c) can be evacuated from the reactor.

* * * * *